US012746802B2

(12) United States Patent
Yang et al.

(10) Patent No.: US 12,746,802 B2
(45) Date of Patent: Sep. 29, 2026

(54) FOLDING WIND DEFLECTOR WITH STORAGE CHAMBER FOR GOLF CART

(71) Applicant: GUANGZHOU ISSYZONE TECHNOLOGY CO., LIMITED, Guangzhou (CN)

(72) Inventors: Taiping Yang, Shenzhen (CN); Ning Wang, Changsha (CN)

(73) Assignee: GUANGZHOU ISSYZONE TECHNOLOGY CO., LIMITED, Guangzhou (CN)

( * ) Notice: Subject to any disclaimer, the term of this patent is extended or adjusted under 35 U.S.C. 154(b) by 320 days.

(21) Appl. No.: 18/628,966

(22) Filed: Apr. 8, 2024

(65) Prior Publication Data

US 2025/0236161 A1 Jul. 24, 2025

(30) Foreign Application Priority Data

Jan. 24, 2024 (CN) ........................ 202420182128.3

(51) Int. Cl.
*B60J 1/06* (2006.01)
*A63B 57/20* (2015.01)
*B60J 1/00* (2006.01)

(52) U.S. Cl.
CPC ................. *B60J 1/06* (2013.01); *A63B 57/20* (2015.10); *B60J 1/006* (2013.01)

(58) Field of Classification Search
CPC ..... B60J 1/06; B60J 1/006; B60J 10/38; B60J 1/02; B60J 10/34; B60J 10/777; B60J 1/00; B60J 1/025; B60J 1/04; A63B 57/20; A63B 47/002; A63B 47/00; A63B 71/0036; A63B 60/38; B62D 25/08; B62B 2202/407; B60Y 2200/86; B60R 2011/004; B60R 2011/0042; B60R 2011/008; B60R 9/00
See application file for complete search history.

(56) References Cited

U.S. PATENT DOCUMENTS

2016/0318376 A1* 11/2016 Martin ..................... B60J 1/006
2021/0086047 A1* 3/2021 Morgan ................. A63B 55/61
2025/0042229 A1* 2/2025 Woodrow .................. B60J 1/04

* cited by examiner

*Primary Examiner* — Amy R Weisberg
*Assistant Examiner* — Anayansi Santiago
(74) *Attorney, Agent, or Firm* — Birchwood IP

(57) ABSTRACT

The present disclosure discloses a folding wind deflector with a storage chamber for a golf cart, including an upper baffle (1), a lower baffle (4) hinged with the upper baffle (1) through a hinge (3), and a storage chamber provided at a lower end of a front panel surface of the lower baffle (4). The present disclosure has a simple structure and is convenient to use. Through the storage chamber, it is convenient for storing small items and sports items carried by a driver and passenger. By providing a partition in the storage chamber, the storage chamber is divided into a small object storage chamber and a golf ball storage chamber, so that the object can be classified and stored in a more orderly manner, rendering it easier for the driver and passenger to pick up the required objects.

8 Claims, 1 Drawing Sheet

FOLDING WIND DEFLECTOR WITH STORAGE CHAMBER FOR GOLF CART

TECHNICAL FIELD

The present disclosure relates to the field of folding windshields for vehicles technologies, and in particular, to a folding wind deflector with a storage chamber for a golf cart.

BACKGROUND

"Golf cart" is a mean of transportation in golf. For ease of use, "golf cart" is generally designed without obstruction, with only a sun visor at a top and a wind deflector in front of the cart. The wind deflector is mostly a traditional integrated baffle, which can only be used for wind protection and does not have a storage function, rendering it inconvenient for drivers and passengers to store small items with them. Therefore, it is needed to provide a wind deflector for golf carts that can not only provide wind protection but also store small items and other items.

SUMMARY

A purpose of the present disclosure is to overcome the shortcomings of the existing wind deflector for golf carts, which is inconvenient for storing small items carried by drivers and passengers, and provide a folding wind deflector with a storage chamber for golf carts that can not only prevent wind, but also store small items and other items.

A purpose of the present disclosure is achieved through the following technical solution: a folding wind deflector with a storage chamber for a golf cart, including an upper baffle, a lower baffle hinged with the upper baffle through a hinge, and a storage chamber provided at a lower end of a front panel surface of the lower baffle; the storage chamber is composed of a horizontal chamber plate and two vertical chamber plates; the two vertical chamber plates are vertically and symmetrically fixed on the front panel surface of the lower baffle; a gap is formed between the two vertical chamber plates; the horizontal chamber plate is provided on a front side wall of the two vertical chamber plates, a lower plate part of the horizontal chamber plate is in contact with the lower baffle.

In an embodiment of the present disclosure, the storage chamber is provided with one or more partitions, the partition is provided between the two vertical chamber plates, and the partition is respectively connected to the lower baffle and the horizontal chamber plate; when the partition is one partition, the partition divides the storage chamber into a small object storage chamber and a golf ball storage chamber; when the partition is multiple partitions, the multiple partitions divide the storage chamber into multiple small object storage chambers and multiple golf ball storage chambers.

In an embodiment of the present disclosure, the horizontal chamber plate is provided with a ball outlet hole connected to the golf ball storage chamber, a limit plate configured to prevent the golf ball from sliding is provided on a lower wall of the outlet hole, a front end of the limit plate is tilted upwards.

In an embodiment of the present disclosure, a support plate is provided at a lower end of the horizontal chamber plate, an angle a is formed between the support plate and the horizontal chamber plate, 90°<a<180°; the front panel surface of the lower baffle is adhered to the support plate.

In an embodiment of the present disclosure, connection surfaces between the two vertical chamber plates and the partition with the horizontal chamber panel are inclined surfaces, inclination of the inclined surfaces matches the included angle a.

In order to facilitate the folding and installation of the wind deflector, and render folding, installation, and disassembly of the wind deflector more convenient, both the upper baffle and the lower baffle are provided with one or more sets of magnetic connectors, each set of magnetic connectors is composed of two magnetic blocks; the two magnetic blocks are symmetrically provided at two ends of the upper baffle and the lower baffle, respectively.

In an embodiment of the present disclosure, the hinge is a soft hinge.

In an embodiment of the present disclosure, the upper baffle, lower baffle, vertical chamber plate, partition, and horizontal chamber plate are all transparent polycarbonate, (PC) plates.

Compared with existing technologies, the present disclosure has the following advantages and beneficial effects:

(1) the present disclosure has a simple structure and is convenient to use. Through the storage chamber at the lower end of the front panel surface of the lower baffle, it is convenient for storing small items and sports items carried by drivers and passengers; at the same time, by providing with partitions in the storage chamber, the storage chamber is divided into a small object storage chamber and a golf ball storage chamber, so that the objects can be classified and stored in a more orderly manner, rendering it easier for drivers and passengers to pick up the required objects. Therefore, the present disclosure effectively solves the defect of the current wind deflector for golf cart with no storage function.

(2) The present disclosure is provided with a ball outlet hole connected to the golf ball storage chamber on the horizontal chamber plate, which facilitates the retrieval of the golf ball. A limit plate is provided on the lower wall of the outlet hole, the front end of the limit plate tilts upwards to prevent the golf ball from falling out of the outlet hole while the vehicle is driving, rendering the retrieval of the golf ball more convenient.

(3) The upper baffle and lower baffle of the present disclosure are hinged by a hinge, allowing the upper baffle to flip up and down. The upper baffle can stand in front of the golf cart, achieving a windproof effect. The upper baffle can also be folded on the lower baffle, improving a ventilation effect of the golf cart.

NUMERAL REFERENCE

1—Upper baffle, 2—Magnetic block, 3—Hinge, 4—Lower baffle, 5—Golf ball storage chamber, 6—Vertical chamber plate, 7—Partition, 8—Horizontal chamber plate, 9—Support plate, 10—Ball outlet hole, 11—Limit plate, 12—Small object storage chamber.

DESCRIPTION OF EMBODIMENTS

The following will provide further detailed explanations of the present disclosure in combination with specific embodiments, but the embodiments of the present disclosure are not limited to this.

EMBODIMENT

Figure 1:
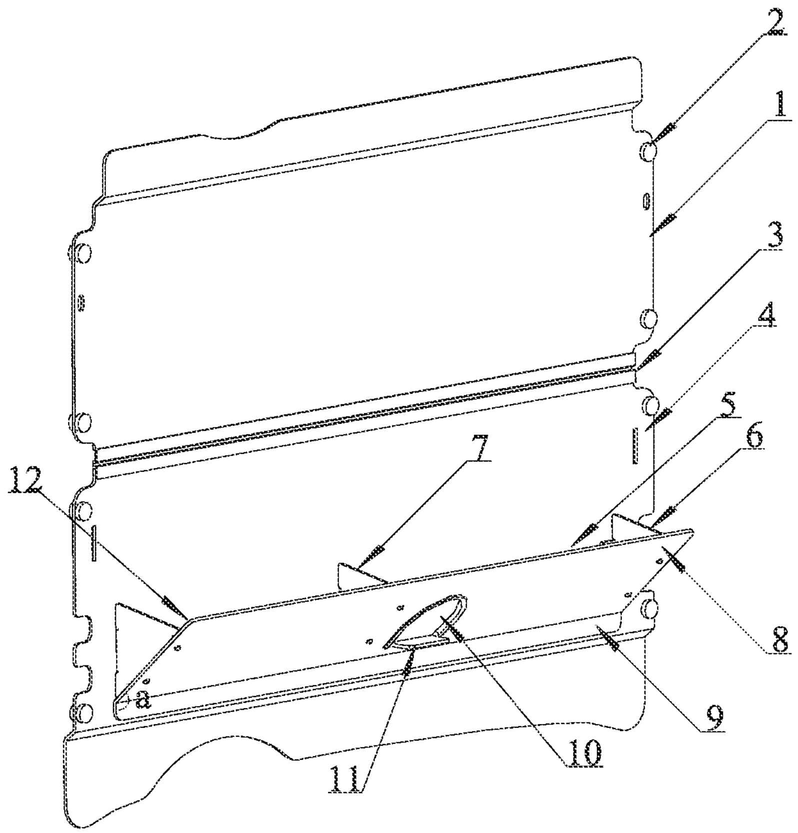
FIG. 1 is a schematic diagram of an overall structure of the present disclosure.
Figure 2:
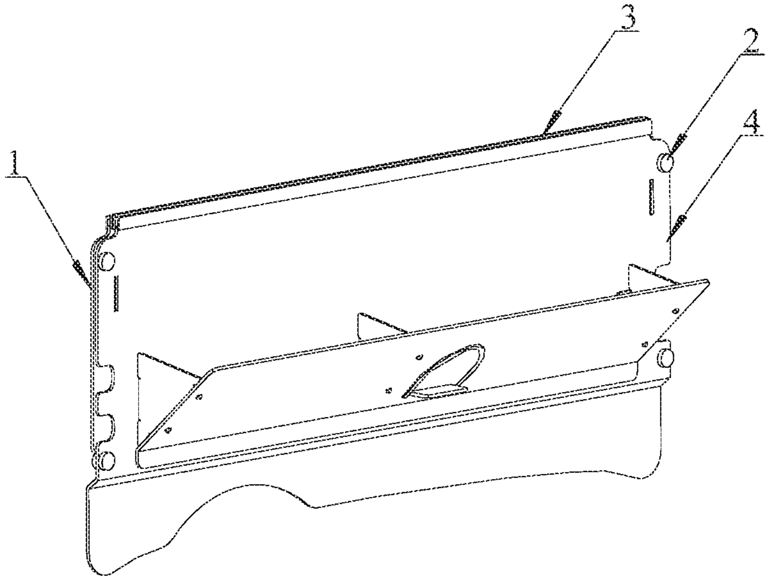
FIG. 2 is a schematic diagram of an upper baffle being folded of the present disclosure.

As shown in FIGS. 1 and 2, a folding wind deflector with a storage chamber for the golf cart of the present disclosure includes an upper baffle 1, a lower baffle 4, and a storage chamber. Specifically, the lower baffle 4 is hinged with the upper baffle 1 through a hinge 3, allowing the upper baffle 1 to flip up and down. That is, the upper baffle 1 can stand on the lower baffle 4 or flip down to fold the upper baffle 1 onto the lower baffle 4. One end of the hinge 3 is fixed to the lower baffle 4 with adhesive, the other end is fixed to the upper baffle 1 with adhesive. When in use, the lower baffle 4 and upper baffle 1 are installed on a bracket in front of the golf cart. In order to facilitate the folding and installation of the wind deflector, and to render the folding, installation, and disassembly of the wind deflector more convenient, more than one set of magnetic connectors are provided on both the upper baffle 1 and the lower baffle 4.

Each set of magnetic connectors consists of two magnetic blocks 2. The two magnetic blocks 2 are symmetrically provided at two ends of upper baffle 1 and lower baffle 4, respectively. When installing, the magnetic blocks 2 on the upper baffle 1 and lower baffle 4 are simply attached to the bracket in front of the golf cart to quickly complete the installation of an entire windshield. But when it is necessary to fold the upper baffle 1 onto the lower baffle 4, the upper baffle 1 is simply pulled to detach the magnetic block 2 on the upper baffle 1 from the bracket in front of the golf cart, the upper baffle 1 is quickly folded onto the lower baffle 4. After folding the upper baffle 1, as shown in FIG. 2. In this embodiment, the upper baffle 1 and lower baffle 4 are both prioritized to be implemented using transparent PC plates with scratch resistance, while the hinge 3 is prioritized to be a soft hinge. In actual use, the upper baffle 1 and lower baffle 4 can also be implemented using other transparent plates as needed.

As shown in FIG. 1, the storage chamber is provided at the lower end of the front panel surface of the lower baffle 4. The storage chamber is composed of a horizontal chamber plate 8 and two vertical chamber plates 6. The two vertical chamber plates 6 are symmetrically and vertically fixed on the front panel surface of the lower baffle 4, a gap is formed between the two vertical chamber plates 6. During installation, the two vertical chamber plates 6 are fixed to the front panel surface of the lower baffle 4 by a screw. The horizontal chamber plate 8 is provided on front side walls of the two vertical chamber plates 6. One end of the horizontal chamber plate 8 is fixed to one of the vertical chamber plates 6 by a screw, the other end thereof is fixed to the other vertical chamber plate 6 by a screw. A lower part of the horizontal chamber plate 8 is in contact with the lower baffle 4. Specifically, an upper end of the horizontal chamber plate 8 is tilted downwards, causing a width of the storage chamber opening to be greater than its bottom width, effectively reducing a volume of the storage chamber and ensuring that it does not affect an operation of the cart. In this embodiment, both the horizontal chamber plate 8 and the vertical chamber plate 6 are preferentially implemented using transparent PC plates with scratch resistance.

As shown in FIG. 1, the horizontal chamber plate 8 is provided with a ball outlet hole 10 connected to the golf ball storage chamber 5 for easy retrieval of the golf ball. In order to prevent the golf ball from falling out of the hole while the cart is in motion and to facilitate the retrieval of the golf ball, a limit plate 11 is obliquely provided on a lower wall of the ball outlet hole 10 to prevent the golf ball from slipping. During a specific installation, the front end of limit plate 11 tilts upwards. In order to improve a stability of the horizontal chamber plate 8, a support plate 9 is provided at a lower end of the horizontal chamber plate 8. The support plate 9 and the horizontal chamber plate 8 are fixed together, an angle (a) is formed between the support plate 9 and the horizontal chamber plate 8, $90° < a < 180°$. The front panel surface of the lower baffle 4 is in contact with the support plate 9.

As shown in FIG. 1, the storage chamber is provided with one or more partitions 7. Specifically, the partition 7 is provided between the two vertical chamber plates 6, which are respectively connected to the lower baffle 4 and the horizontal chamber plate 8 and fixed with a screw. Connection surfaces between the two vertical chamber plates 6 and the partition 7 with the horizontal chamber plate 8 are both inclined planes, an inclination of the inclined plane matches the angle (a), rendering a connection between the horizontal chamber plate 8 and the partition 7 with the vertical chamber plates 6 closer. When the partition 7 is one partition, it divides the storage chamber into a small object storage chamber 12 and a golf ball storage chamber 5. When the partition 7 is multiple partitions 7, the storage chamber is divided into multiple small object storage chambers 12 and multiple golf ball storage chambers 5. The number of partitions 7 should be provided according to the needs of use. In this embodiment, the partition 7 is preferentially implemented using a transparent PC plate.

When using it, the magnetic blocks 2 on the upper baffle 1 and lower baffle 4 can be adsorbed on the bracket in front of the golf cart to quickly complete an installation of the entire wind deflector. During installation, the storage chamber is located above a control panel of the cart. When folding the upper baffle 1 onto the lower baffle 4, the upper baffle 1 is simply pulled so that the magnetic block 2 on the upper baffle 1 is detached from the bracket in front of the golf cart, and the upper baffle 1 can be quickly folded onto the lower baffle 4. The small object storage chamber 12 is configured to store small personal items of drivers and passengers, such as water cups, scoreboards, gloves, etc. Golf ball storage chamber 5 is configured to store golf balls required for sports. Therefore, the present disclosure facilitates the storage of small items and sports items carried by drivers and passengers through the storage chamber located at a lower end of the front panel surface of the lower baffle 4. At the same time, by providing a partition 7 in the storage chamber, the storage chamber is divided into a small object storage chamber and a golf ball storage chamber, so that the objects can be classified and stored in a more orderly manner, rendering it easier for a driver and passenger to retrieve required objects, this effectively solves the defect of the existing wind deflector for golf cart with no storage function.

As mentioned above, the present disclosure can be well implemented.

What is claimed is:

1. A folding wind deflector with a storage chamber for a golf cart, comprising: an upper baffle, a lower baffle hinged with the upper baffle through a hinge, and a storage chamber provided at a lower end of a front panel surface of the lower baffle;

wherein the storage chamber is composed of a horizontal chamber plate and two vertical chamber plates; the two vertical chamber plates are vertically and symmetrically fixed on the front panel surface of the lower baffle; a gap is formed between the two vertical chamber plates; the horizontal chamber plate is provided on a front side wall of the two vertical chamber plates, a lower plate part of the horizontal chamber plate is in contact with the lower baffle.

2. The folding wind deflector with a storage chamber for a golf cart according to claim 1, wherein the storage chamber is provided with one or more partitions, wherein the partition is provided between the two vertical chamber plates, and the partition is respectively connected to the lower baffle and the horizontal chamber plate;

when the partition is one partition, the partition divides the storage chamber into a small object storage chamber and a golf ball storage chamber;

when the partition is multiple partitions, the multiple partitions divide the storage chamber into multiple small object storage chambers and multiple golf ball storage chambers.

3. The folding wind deflector with a storage chamber for a golf cart according to claim 2, wherein the horizontal chamber plate is provided with a ball outlet hole connected to the golf ball storage chamber, a limit plate configured to prevent a golf ball from sliding is provided on a lower wall of the outlet hole, a front end of the limit plate is tilted upwards.

4. The folding wind deflector with a storage chamber for a golf cart according to claim 3, wherein a support plate is provided at a lower end of the horizontal chamber plate, an angle a is formed between the support plate and the horizontal chamber plate, 90°<a<180°; the front panel surface of the lower baffle is adhered to the support plate.

5. The folding wind deflector with a storage chamber for a golf cart according to claim 4, wherein connection surfaces between the two vertical chamber plates and the partition with the horizontal chamber panel are respectively inclined surfaces, inclination of the inclined surfaces matches the included angle a.

6. The folding wind deflector with a storage chamber for a golf cart according to claim 1, wherein both the upper baffle and the lower baffle are provided with one or more sets of magnetic connectors, each set of magnetic connectors is composed of two magnetic blocks; the two magnetic blocks are symmetrically provided at two ends of the upper baffle and the lower baffle, respectively.

7. The folding wind deflector with a storage chamber for a golf cart according to claim 6, wherein the hinge is a soft hinge.

8. The folding wind deflector with a storage chamber for a golf cart according to claim 7, wherein the upper baffle, lower baffle, two vertical chamber plates, a partition, and horizontal chamber plate are all transparent polycarbonate, (PC) plates.

* * * * *